United States Patent
Kozma et al.

[11] Patent Number: 5,859,076
[45] Date of Patent: Jan. 12, 1999

[54] OPEN CELL FOAMED ARTICLES INCLUDING SILANE-GRAFTED POLYOLEFIN RESINS

[75] Inventors: Matthew L. Kozma; John D. Bambara, both of Osterville; Robert F. Hurley, Centerville, all of Mass.

[73] Assignee: Sentinel Products Corp., Hyannis, Mass.

[21] Appl. No.: 872,736

[22] Filed: Jun. 11, 1997

Related U.S. Application Data

[63] Continuation-in-part of Ser. No. 749,740, Nov. 15, 1996.

[51] Int. Cl.$^6$ .......................................... C08J 9/00
[52] U.S. Cl. ............................ 521/79; 521/82; 521/142; 525/64; 525/191; 525/197; 525/245; 525/290; 525/330.9; 525/331.9; 264/45.2; 264/45.9
[58] Field of Search ................. 521/142, 79, 82, 521/50; 264/504, 45.2, 45.9; 525/64, 191, 197, 245, 290, 330.9, 331.9

[56] References Cited

U.S. PATENT DOCUMENTS

| | | |
|---|---|---|
| 2,254,203 | 9/1941 | Bender . |
| 2,387,730 | 10/1945 | Alderson, Jr. . |
| 2,450,436 | 10/1948 | McIntire . |
| 2,515,250 | 7/1950 | McIntire . |
| 2,740,157 | 4/1956 | McCurdy et al. . |
| 2,988,777 | 6/1961 | Bieber et al. . |
| 3,067,147 | 12/1962 | Roberts et al. . |
| 3,098,831 | 7/1963 | Carr . |
| 3,098,832 | 7/1963 | Pooley et al. . |
| 3,238,565 | 3/1966 | Jacobs . |
| 3,287,477 | 11/1966 | Vesilind . |
| 3,335,892 | 8/1967 | Hildreth . |
| 3,338,864 | 8/1967 | Magell et al. . |
| 3,346,686 | 10/1967 | Collins . |
| 3,379,802 | 4/1968 | Raley et al. . |
| 3,396,062 | 8/1968 | White . |
| 3,399,098 | 8/1968 | Omoto et al. . |
| 3,413,387 | 11/1968 | Ohsol . |
| 3,413,388 | 11/1968 | Lux et al. . |
| 3,431,163 | 3/1969 | Gilbert . |
| 3,431,164 | 3/1969 | Gilbert . |
| 3,539,473 | 11/1970 | Simpson et al. . |
| 3,565,243 | 2/1971 | Freeman . |
| 3,639,304 | 2/1972 | Raley, Jr. . |
| 3,644,230 | 2/1972 | Cronin . |
| 3,645,155 | 2/1972 | Robinson . |
| 3,645,992 | 2/1972 | Elston . |
| 3,646,155 | 2/1972 | Scott et al. . |
| 3,651,183 | 3/1972 | Hosoda et al. . |
| 3,711,584 | 1/1973 | Sagane et al. . |

(List continued on next page.)

FOREIGN PATENT DOCUMENTS

| | | |
|---|---|---|
| 451864 | 10/1948 | Canada . |
| 0 584 927 A2 | 7/1993 | European Pat. Off. . |
| 90/03414 | 4/1990 | WIPO . |
| 92/14784 | 9/1992 | WIPO . |
| 93/03093 | 2/1993 | WIPO . |

OTHER PUBLICATIONS

Borg "Ethylene/Propylene Rubber" *Rubber Technology*, Van Nostrand Reinhold Company, New York, 1973.

Mukherjee et al. "Radiation–Induced Changes in Polyolefins" *Macromol. Chem. Phys*, C26:415–439, 1986.

Park "Polyolefin Foam" *Handbook of Polymeric Foams and Foam Technology*, Oxford University Press, Chapter 9, pp. 156–242.

Ultsch & Fritz "Crosslinking of LLDPE and VLDPE via graft–polymerized vinyltrimethozysilane" *Rubber Processing and Applications* 13:81–91, 1990.

*Primary Examiner*—Duc Truong
*Attorney, Agent, or Firm*—Fish & Richardson P.C.

[57] ABSTRACT

Open cell foamed articles including silane-grafted single-site inititiated polyolefin resins are described. The single-site initiated olefin polymer resin can be a polyethylene, a copolymer of ethylene, a C3–C20 alpha-olefin, or a copolymer of ethylene, a C3–C20 alpha-olefin and a C4–C20 diene. The open cell foamed articles have good cushioning properties and can be non-allergenic.

30 Claims, 3 Drawing Sheets

U.S. PATENT DOCUMENTS

| | | |
|---|---|---|
| 3,743,611 | 7/1973 | Muroi et al. . |
| 3,755,208 | 8/1973 | Ehrenfreund . |
| 3,804,684 | 4/1974 | Tokushige et al. . |
| 3,808,300 | 4/1974 | Miyamoto et al. . |
| 3,814,779 | 6/1974 | Wiley . |
| 3,886,100 | 5/1975 | Yasuda et al. . |
| 3,936,518 | 2/1976 | Soda et al. . |
| 3,938,661 | 2/1976 | Carmody . |
| 3,949,028 | 4/1976 | Murakami et al. . |
| 3,953,558 | 4/1976 | Hatano et al. . |
| 3,954,929 | 5/1976 | Hoenke . |
| 3,959,189 | 5/1976 | Kitamori . |
| 3,960,784 | 6/1976 | Rubens . |
| 3,965,054 | 6/1976 | Nojiri et al. . |
| 3,966,381 | 6/1976 | Suh . |
| 3,976,530 | 8/1976 | Callan . |
| 3,996,171 | 12/1976 | Holland et al. . |
| 4,048,275 | 9/1977 | Usamoto et al. . |
| 4,053,341 | 10/1977 | Kleiner et al. . |
| 4,058,583 | 11/1977 | Glander et al. . |
| 4,062,712 | 12/1977 | Stark . |
| 4,076,698 | 2/1978 | Anderson et al. . |
| 4,080,344 | 3/1978 | Ikeda et al. . |
| 4,089,818 | 5/1978 | Slocumb . |
| 4,102,720 | 7/1978 | Kaneko et al. . |
| 4,102,829 | 7/1978 | Watanabe et al. . |
| 4,110,269 | 8/1978 | Ehrenfruend . |
| 4,117,195 | 9/1978 | Swarbrick et al. . |
| 4,126,598 | 11/1978 | Reighter . |
| 4,142,956 | 3/1979 | Shikinami et al. . |
| 4,146,598 | 3/1979 | Coyne . |
| 4,160,072 | 7/1979 | Shinkal et al. . |
| 4,163,085 | 7/1979 | Kuhnel et al. . |
| 4,168,353 | 9/1979 | Kitamori . |
| 4,181,647 | 1/1980 | Beach . |
| 4,181,762 | 1/1980 | Benedyk . |
| 4,182,398 | 1/1980 | Salyer et al. . |
| 4,203,815 | 5/1980 | Noda et al. . |
| 4,209,473 | 6/1980 | Coyne . |
| 4,211,590 | 7/1980 | Steward et al. . |
| 4,215,202 | 7/1980 | Park . |
| 4,225,650 | 9/1980 | van Brederode et al. . |
| 4,226,946 | 10/1980 | Park et al. . |
| 4,228,255 | 10/1980 | Fujimoto et al. . |
| 4,234,531 | 11/1980 | Jocteur . |
| 4,241,832 | 12/1980 | Bliss . |
| 4,247,651 | 1/1981 | Ohno et al. . |
| 4,275,023 | 6/1981 | Shimizu et al. . |
| 4,292,106 | 9/1981 | Herschdorfer et al. . |
| 4,303,756 | 12/1981 | Kajimura et al. . |
| 4,303,757 | 12/1981 | Kajimura et al. . |
| 4,308,352 | 12/1981 | Knaus . |
| 4,333,898 | 6/1982 | Schmidtchen . |
| 4,337,321 | 6/1982 | Allada . |
| 4,347,329 | 8/1982 | Park . |
| 4,370,378 | 1/1983 | Zabrocki et al. . |
| 4,379,859 | 4/1983 | Hirosawa et al. . |
| 4,389,514 | 6/1983 | Schmidle et al. . |
| 4,395,459 | 7/1983 | Herschdorfer et al. . |
| 4,399,087 | 8/1983 | Akiyama et al. . |
| 4,429,059 | 1/1984 | Ozutsumi et al. . |
| 4,433,029 | 2/1984 | Senda et al. . |
| 4,440,703 | 4/1984 | Akiyama et al. . |
| 4,443,393 | 4/1984 | Akiyama et al. . |
| 4,444,948 | 4/1984 | Hochstrasser et al. . |
| 4,446,254 | 5/1984 | Nakae et al. . |
| 4,448,901 | 5/1984 | Senda et al. . |
| 4,464,425 | 8/1984 | Voigt et al. . |
| 4,473,665 | 9/1984 | Martini-Vvedensky et al. . |
| 4,504,534 | 3/1985 | Adachi et al. . |
| 4,510,031 | 4/1985 | Matsummura et al. . |
| 4,515,907 | 5/1985 | McCullough et al. . |
| 4,526,930 | 7/1985 | Keogh . |
| 4,542,164 | 9/1985 | Nishioka et al. . |
| 4,554,293 | 11/1985 | Park . |
| 4,581,383 | 4/1986 | Park . |
| 4,591,606 | 5/1986 | Bergström . |
| 4,592,468 | 6/1986 | Wallace . |
| 4,605,682 | 8/1986 | Park . |
| 4,633,361 | 12/1986 | Ela et al. . |
| 4,640,933 | 2/1987 | Park . |
| 4,652,588 | 3/1987 | Park . |
| 4,663,361 | 5/1987 | Park . |
| 4,666,946 | 5/1987 | Fudge . |
| 4,692,471 | 9/1987 | Fudge . |
| 4,694,025 | 9/1987 | Park . |
| 4,694,027 | 9/1987 | Park . |
| 4,702,868 | 10/1987 | Pontiff et al. . |
| 4,709,817 | 12/1987 | Keady et al. . |
| 4,714,716 | 12/1987 | Park . |
| 4,725,492 | 2/1988 | Yazaki et al. . |
| 4,739,547 | 4/1988 | Tanaka et al. . |
| 4,759,992 | 7/1988 | Tomko et al. . |
| 4,762,860 | 8/1988 | Park . |
| 4,767,814 | 8/1988 | Bae et al. . |
| 4,791,143 | 12/1988 | Tanaka et al. . |
| 4,791,147 | 12/1988 | Tanaka et al. . |
| 4,818,789 | 4/1989 | Tomko et al. . |
| 4,824,059 | 4/1989 | Butler . |
| 4,837,272 | 6/1989 | Kelley . |
| 4,850,913 | 7/1989 | Szabad, Jr. . |
| 4,868,044 | 9/1989 | Tanaka et al. . |
| 4,870,111 | 9/1989 | Donuiff et al. . |
| 4,873,042 | 10/1989 | Topcik . |
| 4,900,490 | 2/1990 | Kozma . |
| 4,908,166 | 3/1990 | Salyer . |
| 4,918,111 | 4/1990 | Tanaka et al. . |
| 4,937,284 | 6/1990 | Bergström . |
| 4,937,299 | 6/1990 | Ewen et al. . |
| 4,940,632 | 7/1990 | Nicola et al. . |
| 4,958,770 | 9/1990 | Mitchell . |
| 4,960,830 | 10/1990 | Hazelton et al. . |
| 5,026,736 | 6/1991 | Pontiff . |
| 5,047,476 | 9/1991 | Keogh . |
| 5,053,446 | 10/1991 | Salyer . |
| 5,064,802 | 11/1991 | Stevens et al. . |
| 5,064,903 | 11/1991 | Peiffer . |
| 5,086,121 | 2/1992 | Hazelton et al. . |
| 5,093,206 | 3/1992 | Schoenbeck . |
| 5,098,778 | 3/1992 | Minnick . |
| 5,112,919 | 5/1992 | Furrer et al. . |
| 5,132,380 | 7/1992 | Stevens et al. . |
| 5,149,574 | 9/1992 | Gross et al. . |
| 5,151,204 | 9/1992 | Struglinski . |
| 5,186,851 | 2/1993 | Gutierrez et al. . |
| 5,206,075 | 4/1993 | Hodgson, Jr. . |
| 5,210,150 | 5/1993 | Prejean . |
| 5,246,783 | 9/1993 | Spenadel et al. . |
| 5,268,115 | 12/1993 | Gutierrez et al. . |
| 5,272,236 | 12/1993 | Lai et al. . |
| 5,275,744 | 1/1994 | Gutierrez et al. . |
| 5,277,833 | 1/1994 | Song et al. . |
| 5,278,264 | 1/1994 | Spaleck et al. . |
| 5,278,272 | 1/1994 | Lai et al. . |
| 5,288,762 | 2/1994 | Park et al. . |
| 5,304,580 | 4/1994 | Shibayama et al. . |
| 5,318,649 | 6/1994 | Nishino et al. . |
| 5,322,728 | 6/1994 | Davey et al. . |
| 5,329,033 | 7/1994 | Spaleck et al. . |
| 5,340,840 | 8/1994 | Park et al. . |
| 5,345,002 | 9/1994 | Song et al. . |
| 5,350,817 | 9/1994 | Winter et al. . |

| | | |
|---|---|---|
| 5,366,647 | 11/1994 | Gutierrez et al. . |
| 5,369,134 | 11/1994 | Park et al. . |
| 5,370,229 | 12/1994 | Kroeckel et al. . |
| 5,376,428 | 12/1994 | Palazzotto et al. . |
| 5,380,810 | 1/1995 | Lai et al. . |
| 5,382,698 | 1/1995 | Song et al. . |
| 5,385,972 | 1/1995 | Yamamoto et al. . |
| 5,387,620 | 2/1995 | Park et al. . |
| 5,391,629 | 2/1995 | Turner et al. . |
| 5,407,965 | 4/1995 | Park et al. . |
| 5,408,004 | 4/1995 | Lai et al. . |
| 5,461,110 | 10/1995 | Arthurs et al. . |
| 5,589,519 | 12/1996 | Knaus . |
| 5,604,033 | 2/1997 | Arthurs et al. . |
| 5,604,288 | 2/1997 | Furukawa et al. . |
| 5,612,510 | 3/1997 | Hildreth . |

OPEN CELL FOAMED ARTICLES INCLUDING SILANE-GRAFTED POLYOLEFIN RESINS

CROSS REFERENCE TO RELATED APPLICATION

This application is a continuation-in-part of U.S. Ser. No. 08/749,740, filed Nov. 15, 1996, now pending.

BACKGROUND OF THE INVENTION

The invention relates to open cell foamed articles.

Open cell foams emulate the open or interconnected cell structure of the a marine sea sponge. Open cell foams can be used in many different applications. Open cell foams made from polymer resins can be flexible and elastomeric. In contrast, brittle open cell foams can be made from ceramic or glass structures.

The open cell structure permits the flow of a liquid or gas medium through the interconnecting cellular structure of the foam without destroying the foam structure. The liquid can be, for example, water or oil, or the gas can be air or nitrogen. The characteristics of a foam can be modified for specific applications. For example, the foam can act as an absorbent for a specific liquid (e.g., as a sponge). Open cell foams can act as a filtering mechanism, permitting the flow of a liquid or gas through the structure while separating out materials from that flow and retaining the materials in the foam structure. It is possible to impregnate the structure with an additive which can later be mechanically squeezed out for application onto another surface. Open cell foams can also be used in cushioning applications.

Synthetic materials have been developed for producing flexible open cell foams. Natural rubber latex foams provide soft materials for body contact and the application of cosmetics. Polyvinyl chloride (PVC) plastisol foams can have a soft, durable feel that simulates leather to the touch. Open cell foams based on polyurethanes have been made suitable for many applications, such as cushions for packaging, automotive applications, home bedding, filters (e.g., for air conditioners), applicators (e.g., for shoe polish), or sound attenuating panels (e.g., for rooms or speakers). Open cell foams based on ethyl vinyl acetate (EVA) can be made in a melt process to lower foam densities than earlier foams. The EVA-based foams have a high percentage of non-interconnecting cells yielding a primarily open cell foam. The EVA-based open cell foams can be soft and pliable.

SUMMARY OF THE INVENTION

In general, the invention features open cell foamed articles including silane-grafted single-site initiated polyolefin resins. An open cell foam is a foam where there is an interconnection between cells in the foam. There can be greater than about 10 percent open cells (i.e., between 10 and 50 percent) in an open cell foam article, preferably greater than 40 percent, more preferably greater than 80 percent, and most preferably greater than 90 percent. The amount of open cells in a foam can be increased by crushing the foam. A crushed open cell foam can have between 50 and about 98 percent open cells. In contrast, a closed cell foam has a predominance of closed cells.

One way to determine the open cell content of a foam is by measuring the amount of water that is absorbed into the foam when the foam is immersed in water. Another method is the gas-volume method using a pycnometer, such as a Quantachrome Model 1000 pycnometer, which measures the percentage of open cells according to method ASTM D-2858.

In one aspect, the invention features an open cell foamed article including a silane-grafted single-site initiated polyolefin resin. The article can include greater than 5 weight percent of the single-site initiated polyolefin resin, preferably greater than 40 weight percent, and more preferably greater than 75 weight percent.

The single-site initiated polyolefin resin is a polyethylene, a copolymer of ethylene and a C3–C20 alpha-olefin, or a copolymer of ethylene, a C3–C20 alpha-olefin and a C4–C20 diene. For example, the single-site initiated polyolefin resin can be a polyethylene, polypropylene, polystyrene, or ethylene-propylene-diene monomer (EPDM) terpolymer. The single-site initiated polyolefin resin can have a density between about 0.83 and about 0.96 g cm$^{-3}$, a molecular weight distribution between about 1.5 and about 3.5, a melt index in the range of about 0.5 dg/min to about 100 dg/min, and a composition distribution breadth index greater than about 45 percent.

The silane-grafted single-site initiated polyolefin resin can have a silane-graft content of between 0.001 and 4 percent, preferably about 0.1 and 2 percent (e.g., about 1 percent). The silane can include a vinyl silane having 2 or 3 hydrolyzable groups (e.g., vinyl triethoxysilane). The silane can also include an alkyl trialkoxy silane, where the alkyl is a C1 to C20 group and the alkoxy is a C1 to C10 group.

The open cell foamed article can include a partially cross-linked polyolefin blend including the single-site initiated polyolefin resin and a copolymer including ethylene and propylene, an ethylene-propylene-diene monomer terpolymer, an ethylene-vinyl acetate copolymer, an ethylene-maleic anhydride copolymer, an ethylene-ethyl acrylate copolymer, a low density polyethylene, a linear low density polyethylene, a medium density polyethylene, a high density polyethylene, or a polypropylene. The polyolefin blend can be partially silane-grafted.

In another aspect, the invention features a method of making an open cell foamed article. The method includes the steps of providing a mixture including silane-grafted single-site initiated polyolefin resin and a foaming agent, partially cross-linking the mixture, and expanding the mixture to form an open cell foamed article.

The step of expanding the mixture can include free expansion, extruding, or compression molding the mixture at increased temperature. Compression molding can include the steps of pressing the polymer mixture using a high tonnage press at a temperature of between 240° and 480° F. (e.g., between 275° and 320° F.) and a pressure of between 50 and 5000 psi (e.g., between 250 and 2500 psi) for between 20 and 90 minutes followed by heating the polymer mixture at a temperature between 300° and 380° F.

The method can include the step of grafting the polyolefin blend with a silane. The step of cross-linking the polymer blend can include hydrolyzing the silane. The step of cross-linking the polymer blend can further include cross-linking with a peroxide.

The method can include the step of crushing the foamed article after the expanding step. The crushing step increases the percentage of open cells in the foamed article (i.e., to greater than 50 percent, preferably greater than 80 percent). The method can also include the step of pinning the foamed article to further increase the percentage of open cells.

The preferred foam has an average foam density between 1.0 and 25.0 pounds per cubic foot, preferably 1.5 and 3.0 pounds per cubic foot.

The mixture to be foamed can include other resins, cross-linking agents (e.g., less than 1.2 percent dicumyl peroxide), activators (e.g., between 0.1 and 3.5 percent), foaming agents (e.g., between 2 and 30 percent azodicarbonamide), particulate fillers (e.g., less than 95 percent, preferably less than 30 percent calcium carbonate), fibrous fillers, antioxidants, ultraviolet stabilizers, thermal stabilizers, pigments and colorants, cell-growth nucleants such as talc, cell-structure stabilizers such as fatty acids or amides, property-modifiers, processing aids, additives, fire retardants, antistatic components, antimicrobial components, or catalysts to accelerate cross-linking and other reactions.

A low-density polyethylene, or LDPE, is a polymer of ethylene with a density between 0.915 and 0.930 g cm$^{-3}$. Since LDPE is prepared under, for example, free-radical conditions and high pressures, it is highly branched. Highly branched polymers are polymers that have approximately one to two short chain branches for every one hundred carbon atoms in the polymer backbone. A short-chain branch is a branch of a polymer backbone of 6 carbon atoms or less which can be quantified by $^{13}$C NMR spectroscopic methods. See, for example, Randall, *Rev. Macromol. Chem. Phys.*, C29 (2 & 3), p. 285–297, incorporated herein by reference.

A copolymer is a polymer resulting from the polymerization of two or more monomeric species and includes terpolymers (e.g., resulting from the polymerization of three monomeric species), sesquipolymers, and greater combinations of monomeric species. Copolymers are generally polymers of ethylene with a C3–C20 alpha-olefin.

The densities, or specific gravities, of the polymer resins can be measured using ASTM D-792 methods. The cushioning properties of the open cell foamed articles can be measured according to ASTM D-3573 (Condition CC) or ASTM D-1596.

A single-site initiated polyolefin resin is a polyolefin prepared from a single-site initiator that has controlled molecular weights and molecular weight distributions. The polyolefin can be polyethylene or a copolymer of ethylene and alpha-unsaturated olefin monomers. One class of a single-site initiators of particular interest are the metallocene initiators which are described, for example, in J. M. Canich, U.S. Pat. No. 5,026,798, in J. Ewen, et al., U.S. Pat. No. 4,937,299, in J. Stevens, et al., U.S. Pat. No. 5,064,802, and in J. Stevens, et al., U.S. Pat. No. 5,132,380, each of which are incorporated herein by reference. These initiators, particularly those based on group 4 transition metals, such as zirconium, titanium and hafnium, are extremely high activity ethylene polymerization initiators.

The single-site initiators are versatile. The polymerization conditions such as a initiator composition and reactor conditions can be modified to provide polyolefins with controlled molecular weights (e.g., in a range from 200 g mol$^{-1}$ to about 1 million or higher g mol$^{-1}$) and controlled molecular weight distributions (e.g., $M_w/M_n$ in a range from nearly 1 to greater than 8, where $M_w$ is the weight average molecular weight and $M_n$ is the number average molecular weight). Molecular weights and molecular weight distributions of polymers can be determined, for example, by gel permeation chromatography.

The polyolefins provided by these initiators can contain uniformly distributed, highly controlled short chain branching sites. Certain polyolefins can have less than about one long-chain branch for every ten thousand carbon atoms in the backbone of the polymer. As described above, one method of determining branching is $^{13}$C NMR spectroscopy.

When the single-site initiated polyolefins are copolymers, the composition distribution breadth index (CDBI) is generally greater than 50% and most preferably above 70%. The CDBI is a measurement of the uniformity of distribution of comonomers among the individual polymer chains having a comonomer content within 50% of the median bulk molar comonomer content. The CDBI of a copolymer can be determined by temperature rising elution fractionation (TREF), as described in, for example, Wild et al., J. Poly. Sci., Poly. Phys. Phys. Ed., Vol. 20, p. 441 (1982).

Melt index (MI) of a polymer resin is a measurement of processability under low shear rate conditions. The MI can be determined by ASTM D-1238 Condition E (190° C./2.16 kg). The MI of the polyolefins is generally between about 0.2 dg/min and about 100 dg/min, preferably, between about 1 dg/min and about 10 dg/min, and most preferably between about 2 dg/min and about 8 dg/min. The melt index of the polymer resins can be measured using ASTM D-1238.

Silane-grafting is attaching one or more silicon-containing monomer or polymer to the original polymer chains. The grafting is generally accomplished by forming active grafting sites on the original polymer chains in the presence of silicon-containing monomers, which can further polymerize as branches from the original polymer chains. Active grafting sites can be generated, for example, by free radicals or anions.

A slow silane is a silane cross-linking agent that hydrolyzes (i.e., cross-links) more slowly than vinyl trimethoxy silane VTMOS (e.g., vinyl triethoxy silane VTEOS). It can take a longer time to cure a slow silane-grafted material than a VTMOS-grafted material.

The silane-grafted polyolefinic materials can be cross-linked, optionally with a peroxide co-cure, to produce an open cell foam article. The rates of reaction for the silane cross-linking mechanism are controlled to permit regulation of the foaming reaction in order to produce open cell material. If a peroxide co-cure is used, a variety of common organic peroxides can be used to further cross-link the polymers. By controlling the cross-linking reaction rates, up to 100% of the single site initiated polyolefin resin, or blends with other polyolefinic materials can be used to make an open cell foamed articles.

The single-site initiated polyolefin resin-based open cell foams can be used in place of EVA, urethane, PVC, or other types of open cell foams. By using silane-grafted polyolefinic materials, in particular those of the single site initiated type, to produce an open cell foam having no toxic residues, permitting their use in medical applications, for example. Specifically, residual materials ordinarily found in urethane, PVC, and EVA can irritate human skin. The amounts of these irritating materials can be reduced or eliminated in open cell foams when single site initiated polyolefin resins are included in the foams. In addition, EVA residuals can interfere with active additives (e.g., nerve gas deactivating chemicals in a gas mask filter). In the single site initiated polyolefin resin open cell foam there are no unwanted materials to be removed from the foamed material for particular applications (and, therefore, no need to remove such materials in separate processing steps), since the polyolefin is essentially inert. By minimizing the amount of additives in the foam, the foams can be produced with material and economic savings. The open cell foams can be used, for example, as air or water filtering media without imparting possible allergenic or potentially toxic components (or otherwise hazardous materials) into a downstream flow of air or water. The open cell foams can also have improved weatherability and durability by resisting drying and cracking.

Other features and advantages of the invention will be apparent from the following detailed description thereof, and from the claims.

DETAILED DESCRIPTION

An open cell foamed article can be prepared from compositions including a single-site initiated polyolefin resin. The preferred level of single-site initiated polyolefin resin included in the foam, as a percentage of total polymeric resin, preferably is greater than 5 percent, more preferably between about 20 and 80 percent, and most preferably between about 40 and 60 percent.

The single-site initiated polyolefin resins are derived from ethylene polymerized with at least one comonomer selected from the group consisting of at least one alpha-unsaturated C3–C20 olefin comonomers. Preferably, the alpha-unsaturated olefins contain between 3 and 16 carbon atoms, most preferably between 3 and 8 carbon atoms. Examples of such alpha-unsaturated olefin comonomers used as copolymers with ethylene include, but are not limited to, propylene, isobutylene, 1-butene, 1-hexene, 3-methyl-1-pentene, 4-methyl-1-pentene, 1-octene, 1-decene, 1-dodecene, styrene, halo- or alkyl-substituted styrene, tetrafluoroethylene, vinylcyclohexene, and vinylbenzocyclobutane.

The comonomer content of the polyolefin resins is generally between about 1 mole percent and about 32 mole percent, preferably between about 2 mole percent and about 26 mole percent, and most preferably between about 6 mole percent and about 25 mole percent.

The copolymer can include one or more C4–C20 polyene monomers. Preferably, the polyene is a straight-chain, branched chain or cyclic hydrocarbon diene, most preferably having between 6 and 15 carbon atoms. It is also preferred that the diene be non-conjugated. Examples of suitable dienes include, but are not limited to, 1,3-butadiene, 1,4-hexadiene, 1,6-octadiene, 5-methyl-1,4-hexadiene, 3,7-dimethyl-1,6-octadiene, 3,7-dimethyl-1,7-octadiene, 5-ethylidene-2-norbornene, and dicyclopentadiene. Especially preferred is 1,4-hexadiene.

The preferred single-site initiated polyolefin resins include either ethylene/alpha-unsaturated olefin copolymers or ethylene/alpha-unsaturated olefin/diene terpolymers.

Preferred single-site initiated polyolefin resins are described, for example, in S.-Y. Lai, et al., U.S. Pat. Nos. 5,272,236, 5,278,272, and 5,380,810, in L. Spenadel, et al., U.S. Pat. No. 5,246,783, in C. R. Davey, et al., U.S. Pat. No. 5,322,728, in W. J. Hodgson, Jr., U.S. Pat. No. 5,206,075, and in F. C. Stehling, et al., WO 90/03414, each of which is incorporated herein by reference. The resins contain varying amounts of short-chain and long-chain branching, which depend, in part, on the processing conditions.

Some single-site initiated polyolefin resins are available commercially from Exxon Chemical Company, Houston, Tex., under the tradename Exact™, and include Exact™ 3022, Exact™ 3024, Exact™ 3025, Exact™ 3027, Exact™ 3028, Exact™ 3031, Exact™ 3034, Exact™ 3035, Exact™ 3037, Exact™ 4003, Exact™ 4024, Exact™ 4041, Exact™ 4049, Exact™ 4050, Exact™ 4051, Exact™ 5008, and Exact™ 8002. Other single-site initiated resins are available commercially from Dow Plastics, Midland, Mich. (or DuPont/Dow), under the tradenames Engage™ and Affinity™, and include CL8001, CL8002, EG8100, EG8150, PL1840, PL1845 (or DuPont/Dow 8445), EG8200, EG8180, GF1550, KC8852, FW1650, PL1880, HF1030, PT1409, CL8003, Dow 8452, Dow 1030, Dow 8950, Dow 8190, and D8130 (or XU583-00-01). Most preferably, the single-site initiated polyolefin resins are selected from the group consisting of Exact™ 3024, Exact™ 3031, Exact™ 4049, PL1845, EG8200, Dow 8452, Dow 1030, Dow 8950, and EG8180.

LDPE resins are described, for example, in "Petrothene® Polyolefins . . . A Processing Guide," Fifth Edition, Quantum USI Division, 1986, pages 6–16, incorporated herein by reference. Some LDPE resins are commercially available from Exxon Chemical Company, Houston, Tex., Dow Plastics, Midland, Mich., Novacor Chemicals (Canada) Limited, Mississauga, Ontario, Canada, Mobil Polymers, Norwalk, Conn., Rexene Products Company, Dallas, Tex., Quantum Chemical Company, Cincinnati, Ohio, and Westlake Polymers Corporation, Houston, Tex. Commercially available LDPE resins include Eastman 1924P, Eastman 1550F, Eastman 800A, Exxon LD 117.08, Exxon LD 113.09, Dow 535I, Dow 683, Dow 760C, Dow 768I, Dow 537I, Novacor LF219A, Novacor LC05173, Novacor LC0522A, Mobil LMA-003, Mobil LFA-003, Rexene 2018 (7018), Rexene 1023, Rexene XO 875, Rexene PE5050, Rexene PE1076, Rexene PE2030, Quantum NA953, Quantum NA951, Quantum NA285-003, Quantum NA271-009, Quantum NA324, Westlake EF606AA, Westlake EF612, and Westlake EF412AA.

Other polymers or resins can be included in the mixture to be foamed, which can alter the physical properties of the foamed article. The polymeric components can be blended before or after the grafting or cross-linking steps. Examples of the polymers and resins which can be added to the mixture include polypropylene, other single-site initiated polyolefin resins, low density polyethylene (LDPE), high density polyethylene (HDPE), linear low density polyethylene (LLDPE), ethylene-propylene rubber, ethylene-propylene-diene monomer terpolymer (EPDM), polystyrene, styrene copolymers, polyvinylchloride (PVC), polyamides, polyacrylates, celluloses, polyesters, polyhalocarbons, and copolymers of ethylene with propylene, isobutene, butene, hexene, octene, vinyl acetate (EVA), vinyl chloride, vinyl propionate, vinyl isobutyrate, vinyl alcohol, allyl alcohol, allyl acetate, allyl acetone, allyl benzene, allyl ether, ethyl acrylate (EEA), methyl acrylate, acrylic acid, or methacrylic acid. Preferred resins include other single-site initiated polyolefins, LDPE, LLDPE, polypropylene, polystyrene, or ethylene copolymers such as EVA, or EEA.

The single-site initiated polyolefin resin is silane grafted. Silane-grafting of the polyolefin resin or resin blend occurs when the polymer backbone is activated and reacts with a silane reagent to form the graft copolymer. The silane-graft can include a subsequently cross-linkable moiety in the graft chain. For example, the cross-linking can occur under warm, moist conditions when the cross-linkable moiety is hydrolyzable, optionally in the presence of a suitable catalyst. Levels of cross-linking can be adjusted by varying the amount of silane-grafting introduced to the polyolefin resin or blend. The silane-grafting can occur in a separate process, or during a continuous blending and extruding process.

Silane-grafting is generally accomplished by adding azido- or vinyl-functional silanes and a graft initiator to the polyolefin resin or blend. The grafting of the polyolefin resin or blend can take place, for example, in an extruder.

The graft initiator can be a free radical generating species, for example, a peroxide. Examples of peroxides include dicumylperoxide, 2,5-dimethyl-2,5-di(t-butylperoxy) hexane, 1,1-bis(t-butylperoxy)-3,3,5-trimethylcyclohexane, 1,1-di-(t-butylperoxy)cyclohexane, 2,2'-bis(t-butylperoxy) diisopropylbenzene, 4,4'-bis(t-butylperoxy)butylvalerate, t-butylperbenzoate, t-butylperterephthalate, and t-butyl peroxide. Most preferably, the graft initiator is dicumylperoxide or 2,2'bis(t-butylperoxy)diisopropylbenzene.

Azido- and vinyl-functional silanes have the general formula $RR'SiY_2$, in which R represents an azido- or vinyl-functional radical attached to silicon through a silicon-carbon bond (e.g., composed of carbon, hydrogen, and optionally sulfur, nitrogen and oxygen), each Y represents a hydrolyzable organic radical (e.g., a radical that can be cleaved from silicon by the addition of water); and R' represents a monovalent hydrocarbon radical or a hydrolyzable organic radical.

Azido-functional silane compounds graft onto the polyolefin resin through a nitrene insertion reaction. Suitable azido-functional silanes include the trialkoxysilanes such as 2-(trimethoxysilyl) ethylphenylsulfonyl azide and 6-(triethoxysilyl) hexylsulfonyl azide.

Vinyl-functional silane compounds graft to the polymer resin by free-radical initiated reactions. Suitable vinyl-functional silanes include vinyl-functional alkoxy silanes such a vinyl trimethoxy silane (VTMOS) and vinyl triethoxy silane (VTEOS). Generally during grafting, graft initiators such as the peroxides are included with the vinyl-functional silane to perform a hydrogen abstraction from the polyolefin resin backbone to initiate grafting and polymerization of the vinyl-functional silane.

The cross-linking of the polyolefinic materials aids in the formation of desirable foams and also leads to the improvement of the ultimate physical properties of the materials. The level of cross-linking in the material can be related to the physical properties of the foam. The silane-grafting cross-linking mechanism is particularly advantageous because it provides a change in the polymer rheology by producing a new polymer structure having improved physical properties. The foam can be partially or extensively cross-linked prior to expansion, or can be extensively cross-linked after expansion.

The silane-grafted polymer resin can be cross-linked by exposure to moisture to effect silanol condensation reactions of the hydrolyzable groups of the pendant silane-grafts. Cross-linking develops through hydrolysis of the silane Y groups to form silanols which condense to form siloxanes. The condensation of silanols to siloxanes is catalyzed by metal carboxylates such as, for example, dibutyl tin dilaurate or dibutyl tin maleate. The metal carboxylates can be added to the polymer resin mixture before grafting, before blending, before extrusion, or before exiting the die. The metal carboxylates are generally added in a liquid form or compounded in a polymer resin.

It is possible to cross-link a polyolefinic material that includes a single or multiple component silane-grafted material by hydrolysis. The silane-grafts can be a vinyl silane (e.g., VTMOS, VTEOS, or other vinyl trialkoxy silane having C2 to C10 alkoxy groups) or a mixture of hydrolyzable silanes. The silane-graft can be a single slow silane, preferably VTEOS, or it can be a combination of VTEOS with an alkyl trialkoxy silane having a C1 to C20 alkyl group and C1 to C10 alkoxy groups, such as hexadecyl trimethoxy silane (Dynasil 9116, available from Huls, Germany).

The use of slow silane-grafted material allows silane cross-linking to occur simultaneously with or subsequent to expanding the foam. For example, when the silane graft was only VTMOS, the cross-linking reactions occurred prior to foaming. By including VTEOS in the silane graft mixture, it is possible to control reaction rates (i.e., cross-linking and foaming rates) to produce materials with excellent physical properties. Due to the high reactivity rate of VTMOS, silane cross-linking levels in compositions grafted with VTMOS were limited to an average of about 0.4% and a maximum of about 0.6% due to processing difficulties. By using slower reacting silanes, such VTEOS or combinations of VTEOS with 9116, higher levels of silane grafting can be used to provide greater cross-linking in later processing steps while maintaining cross-linking uniformity throughout the foamed material.

By using large amounts of slow silanes relative to fast silanes, it is possible to essentially control the relative rates of cross-linking and foaming reactions. In this way, it is possible to of control of reaction rates during foaming, for example, by using long alkyl chain, high molecular weight silanes (such as Dynasil 9116) at levels from 1%–70% of the silane graft mixture. The silane cross-linking step can be delayed by grafting mixtures of VTEOS and 9116.

The graft can include other monomers, such as di-and tri-allyl cyanurates and isocyanurates, alkyl di- and tri-acrylates and methacrylates, zinc dimethacrylates and diacrylates, styrenes, and butadiene.

Most preferably, the silane is VTMOS or VTEOS, that is grafted on to the polymer backbone by a reaction which is initiated by 2,2'-bis(t-butylperoxy)diisopropylbenzene. The most preferred silanol condensation catalyst is dibutyl tin dilaurate, although some compositions do not require added catalyst for cross-linking. The cross-linking can be induced by the presence of ambient moisture in a production line or components of the mixture, atmospheric moisture, steam, or hot water. Cross-linking can take place predominantly (e.g., more than 50% of the potential cross-linking) prior to expansion (or extrusion) of the foam. Alternatively, the cross-linking can take place predominantly after expansion of the foam.

More than one cross-linking mechanism can take place in the materials. By using slow silane-grafted polymers, a co-cross-linking mechanism (i.e., a co-cure or dual cure system) can be used to make a foam with enhanced properties. The polyolefinic materials can be combined with silane-grafted materials and an organic peroxide. By regulating levels and types of organic peroxide relative to silane levels, the relative rates of the steps of the co-cure can be varied to permit foaming of the polymer materials. The resulting materials have high cross-link levels and can have improved physical properties.

The slow silane-grafted materials can withstand long expansion cycles while maintaining dimensional stability and resisting overcuring, which can make the material brittle, and formation of voids, blisters, cracks, or splits. For example, the slow silane-grafted materials can withstand up to two hours of secondary expansion to promote complete curing at elevated temperatures between 320° F. and 400° F. The temperature stability depends, in part, on the level of cross-linking in the material.

Polyolefinic compositions can also be cross-linked with high-energy, ionizing radiation involve the use of equipment which generates electrons, X-rays, Beta-rays or Gamma-rays. The most preferred method for cross-linking olefinic compositions through exposure to ionizing radiation is through the use of an electron-beam radiation source. Exposure of the compositions of the present invention to ionizing radiation may be accomplished at dosages in the range of about 0.1 to 40 Megarads, and preferably, at about 1 to 20 Megarads. U.S. Pat. No. 4,203,815 (Noda) discloses methods of exposing compositions to both high and low-energy ionizing radiation to effect improvements in surface quality, strength and subsequent heat-sealing or embossing processes. The amount of cross-linking may be appropriately controlled by the dosage of ionizing radiation.

Regardless of the method of cross-linking used, acceptable foam articles can only be obtained in certain ranges of cross-linking density or level, which is related to the amount of silane-grafting in the blend. Too much cross-linking prior to foaming can render the foam inelastic, resulting in less than optimal expansion and greater than optimal density for a given level of foaming agent. Too little cross-linking can be detrimental to physical properties such as compression set properties or thermal resistance, for example. It is important to choose cross-linking levels that afford foams with particular desired properties. The silane-grafting and resulting cross-links increase the melt strength of the composition. The cross-linking levels can be determined by establishing the gel content of the composition, for example, by extraction with a solvent such as xylenes. The gel content of the open cell foams are preferably in the range of about 7 to about 98 percent, and more preferably in the range of about 25 to about 60 percent.

The expanding medium, or foaming agent, can include a physical foaming agent or a chemical foaming agent. A physical foaming agent is a medium expanding composition that is a gas at temperatures and pressures encountered during the foam expanding step. Typically, a physical foaming agent is introduced to the polymer blend in the gaseous or liquid state and expands, for example, upon a rapid decrease in pressure.

Physical foaming agents include low molecular weight organic compounds including $C_1$–$C_6$ hydrocarbons such as acetylene, propane, propene, butane, butene, butadiene, isobutane, isobutylene, cyclobutane, cyclopropane, ethane, methane, ethene, pentane, pentene, cyclopentane, pentene, pentadiene, hexane, cyclohexane, hexene, and hexadiene, $C_1$–$C_6$ organohalogens, $C_1$–$C_6$ alcohols, $C_1$–$C_6$ ethers, $C_1$–$C_5$ esters, $C_1$–$C_5$ amines, ammonia, nitrogen, carbon dioxide, neon, or helium. The preferred foaming agents include butane, isobutane, carbon dioxide, and 1,1-difluoroethane (HFC-152a). The preferred physical foaming agent concentration prior to expanding the foam is between 0.5 and 30 percent.

A chemical foaming agent is a compound or a mixture of compounds that decomposes at elevated temperatures to form one or more gasses, which can be used to expand the compositions into a foam. In general, the chemical foaming agent will have a decomposition temperature (with the resulting liberation of gaseous material) from 130° C. to 350° C. Examples of chemical foaming agents include azodicarbonamide, p,p'-oxybis(benzene)sulfonyl hydrazide, p-toluene sulfonyl hydrazide, p-toluene sulfonyl semicarbazide, 5-phenyltetrazole, ethyl-5-phenyltetrazole, dinitroso pentamethylenetetramine, and other azo, N-nitroso, carbonate and sulfonyl hydrazides. In addition, various acid/bicarbonate mixtures decompose into gasses when heated. The preferred chemical foaming agent concentration prior to expanding the foam is between 2 and 30 percent.

The resin can be compounded by mixing it with additives prior to foaming to form a mixture. Other additives that can be added to the foam compositions include particulate and fibrous fillers to reinforce, strengthen or modify the rheological properties of the foam composition, antioxidants (e.g., hindered phenolics such as Irganox 1010, phosphites such as Irgafos 168, or polymerized trimethyl-dihydroquinoline such as Agerite AK, Resin D or Flectol H), ultraviolet stabilizers, thermal stabilizers, antistatic components, flame retardants, pigments, colorants, and other processing aids.

Methods of combining the components of the foamable mixture include, for example, melt-blending, diffusion-limited imbibition, or liquid mixing. Any or all of the ingredients can be pulverized or reduced in particle-size by other methods prior to use. Melt-blending can be accomplished in a batchwise process or a continuous process. The components can be mixed, for example, in an internal mixer such as a Banbury mixer, a single or twin screw extruder, or any other mixer capable of providing sufficient heating for melting and fluxing for complete and uniform mixing of the materials (i.e., a laboratory two roll mill). It is preferred that the blending be carried out with temperature control. The blending or mixing provides a uniform mixture. Components can be introduced to the mixture sequentially at any step during the mixing operation. Once mixed, the hot foamable compounded mixture is sheeted, for example, through a two roll mill.

The sheet can be cut, for example, into a rectangularly shaped preform to fill a prior mold cavity. The preform is inserted into the mold cavity in a preheated hydraulic press. More than one mold can be included in the hydraulic press. Once loaded, the hydraulic press is closed. The filled mold is held in the hydraulic press for predetermined press cycle time to begin the cross-linking and expanding process. The time, temperature, and clamping pressure can be modified to afford foams having optimized properties.

Following the completion of the hydraulic pressing cycle, the press is released and the partially cured and expanded material is removed from the press. The partially cured and expanded material is then transported in the mold to a pre-heated secondary expansion press for a second predetermined press cycle (i.e., time, temperature, and clamping pressure that have previously been determined to optimize foam properties) to complete the cross-linking and expansion of the material.

Once the expanding and cross-linking processes are complete, or nearly complete, the foam block (i.e., bun) can be cooled and removed from the secondary expansion press and the mold cavity. The foamed material is an open cell foamed article. Once cooled, the foam block can be washed and allowed to dry.

Alternatively, the open cell foams can be prepared in a continuous extrusion process or a compression molding process. Under continuous extrusion processes, the mixture can be cross-linked and expanded on a belt or conveyor, or while hanging vertically.

The open cell foam can have between 10 and 50 percent open cells. The expanded foam block can be passed through a crushing device, which can increase the percentage of open cells in the foam by bursting cells that are not interconnecting. The crushing device can include a pinning device that punctures closed cells. Pinning can take place before, during, or after crushing. After crushing, the open cell foam can have greater than 50 percent open cells (i.e., up to 98 percent).

After cross-linking and expanding the mixture including the silane-grafted single-site initiated polyolefin resin into a foam, the foam contains both open and closed cells (i.e., less than 50 percent open cells). The closed cells can be converted to open cells by crushing the foam and allowing the material to recover. The formulation of the foam gives the material the physical properties necessary for recovery. The foam can be crushed manually, mechanically (e.g., with a press), or with a cell crushing apparatus that permits fast material throughput.

Figure 1:
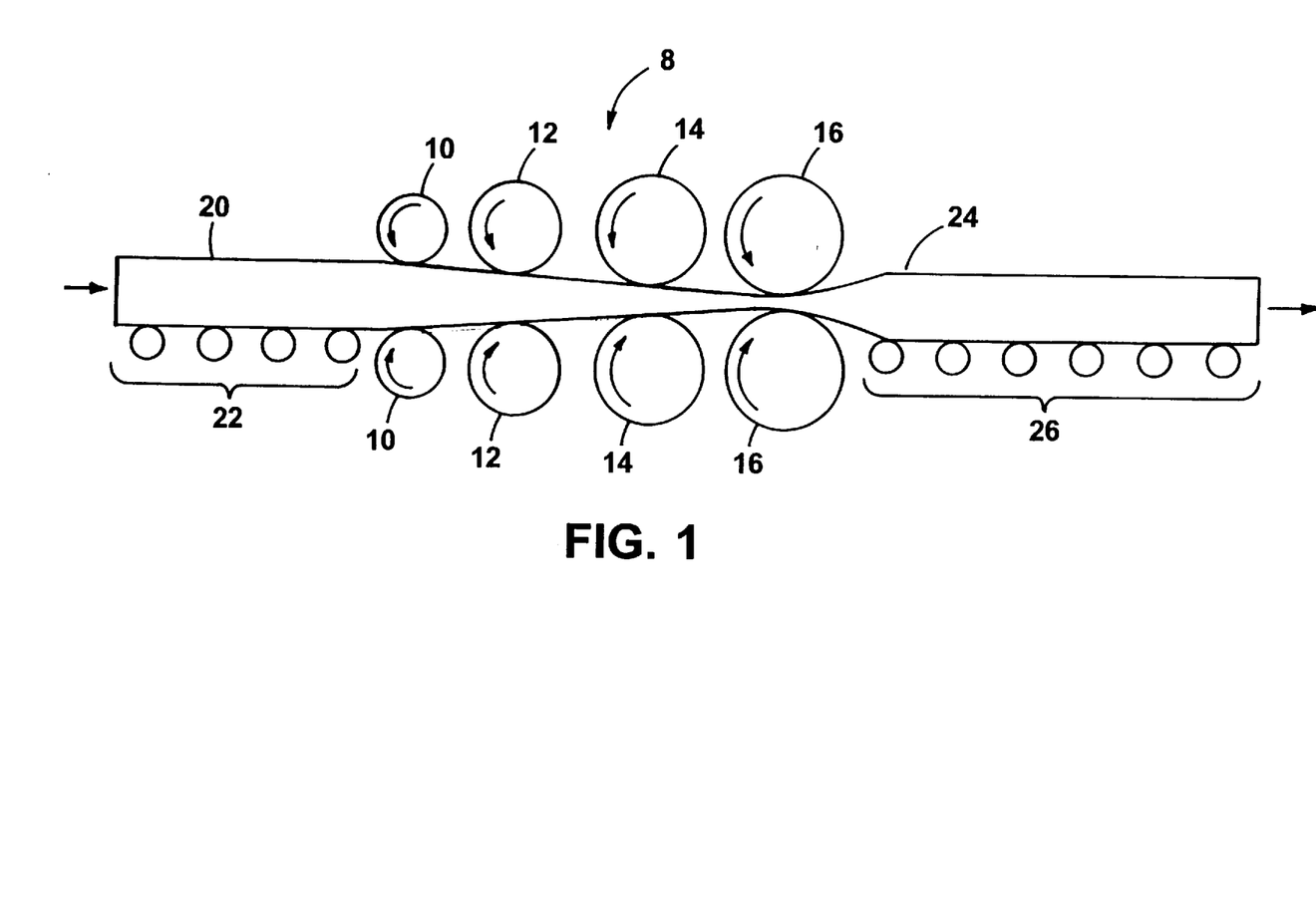
FIG. 1 is a schematic diagram depicting a foam crushing apparatus.

Referring to FIG. 1, the cell crushing apparatus 8 includes feeder rollers 10, a set of nip rollers having increasing diameters 12 and 14, and exit rollers 16. Uncrushed foam 20 is fed into apparatus 8 over entrance roller table 22. Uncrushed foam 20 passes through feeder rollers 10 into nip rollers 12. The diameter of each subsequent nip roller is greater than the preceding rollers. Therefore, the gap between the rollers decreases as the foam passes though the successive nip rollers (i.e., 14), crushing the foam and causing closed cells in the foam to rupture, thereby increasing the open cell content of the foam. The crushed foam 24 passes over exit rollers 16 and recovers to nearly the uncrushed thickness on exit roller table 26. Rollers 10 and 12 are a fixed distance apart. Rollers 14 and 16 are hydraulically controlled to exert pressure on the foam to crush it. The crushed foam has a higher open cell content than it did prior to crushing (i.e., greater than 50 percent open cells). Feeder rollers 10 can include pins on the surface that puncture closed cells and assists in further increasing the open cell content of the foam. The pins can be included on rollers on one side or both sides of the foam. The pins can be textile pins or shark fin shaped pins. The foam can be crushed at temperatures between about 50° and 110° F. The foam can be skived before or after crushing, but is generally skived before use.

Since the open cell foams are based on single-site initiated polyethylene resins, the foams can be non-allergenic and can have long lifetimes and good weatherability because harmful and undesirable ingredients or components are not included in the composition. The open cell foams can permit water flow through the foam, although the foam does not absorb the water. The open cell foams do not tend to support microbial growth.

The foams can be used, for example, in hospital bedding, non-allergenic filtering media, sound attenuation insulation, packaging, cushioning, and medical absorbants. The single-site initiated polyolefin resins can increase the strength of the open cell foam, permitting the use of the open cell foam in applications that require an increase in tensile strength and tear resistance, such as packaging, cushioning, and shock attenuating applications. The open cell foams have good flexibility at low temperatures; the foams can provide cushioning over a broad range of temperatures (i.e., between −90° F. and 200° F.).

The softness of the material can be modified by blending other polymers with the single-site initiated polyolefin resin before expanding to form a foam while maintaining the strength of the material. Similarly, the foam density can also be varied by adjusting the amount and conditions of the cross-linking and expansion steps.

The following specific examples are to be construed as merely illustrative, and not limitive, of the remainder of the disclosure.

EXAMPLE 1

A slow silane-grafted single-site initiated polyolefin resin was used to produce a non-EVA open cell bun material. The single-site initiated polyolefin resin was grafted with VTEOS and compounded with other ingredients to give a material having the following formulation:

| Formulation Component | Example 1 Parts per hundred resin (PHR) |
|---|---|
| Engage 8200 1% VTEOS | 100 |
| Dibutyl tin dilaurate | 0.5 |
| Zinc oxide | 0.5 |
| Azodicarbonamide | 16 |
| Calcium carbonate | 15 |
| Dicumyl peroxide | 0.2 |

The single-site initiated polyolefin resin was grafted with VTEOS by mixing 100 parts of DuPont/Dow Engage™ 8200 with 1.0 parts of vinyl triethoxy silane (VTEOS) and 0.02 parts of 2,2'-bis(t-butylperoxy)-diisopropylbenzene (Vulcup R, available from Hercules Chemical Co.) as the graft initiator. The grafted resin was prepared in a single screw extruder at approximately 375° F. Following the extrusion reaction, the grafted resin was cooled and pelletized for blending.

The cooled, grafted, and pelletized resin was compounded with additional ingredients, including a blowing agent, activators, and additional peroxide cross-linking agent as indicated in the above formulation. All ingredients were incorporated into the grafted resin on a two roll mill set at approximately 250° F. Mixing was accomplished by sequential addition of portions of the materials into the polymer. The fluxed and fused polymer was banded on the heated mill roll surface as is customary in mixing in this operation when there is no availability of an internal high intensity batch mixer. At the completion of the mixing operation, the hot compounded material was sheeted off the mill at approximately ⅜" thickness.

Multiple sheets were plied up (i.e., layered) into a preform for molding in a 1"×7"×10" high pressure hydraulic press mold while still hot. The mold containing the hot compound was put between heated high pressure hydraulic press platens under pressure for 25 minutes at 275° F. at 500 psi. The mold was released and the resulting material was removed from the hydraulic press mold and inserted into a lower pressure mold cavity (i.e., at atmospheric pressure) of the expected final dimensions of 3"×18"×24". The material was allowed to complete cross-linking and expansion in the lower pressure mold cavity for 90 minutes at 330° F. The mold cavity and foamed material therein was cooled with water to room temperature. The foam was crushed using the apparatus depicted in FIG. 1. The expanded material was removed from the mold, yielding a medium fine open cell foam having the physical properties summarized in Table I. The foam had an open cell content of about 95 percent, as determined by a pycnometer.

TABLE I

| | Example 1 | |
|---|---|---|
| Property | Top | Middle |
| Density (pcf) | 2.3 | 1.82 |
| Tensile (psi) | 19.2 | 23.1 |
| Elongation (%) | 354 | 284 |
| 25% Compression Deflection (psi) | 0 | 0.33 |
| 50% Compression Deflection (psi) | 0.33 | 0.65 |
| 50% Compression Set (%) (ASTM-3575) | 3.13 | 3.61 |
| 50% Compression Set (%) (ASTM-1056) | 5.42 | 9.35 |

TABLE I-continued

| Property | Example 1 | |
|---|---|---|
| | Top | Middle |
| Tear Die C (pli) | 7.3 | 6.05 |
| Durometer Shore 00 | 15 | 18 |
| Cell size average (mm) | 0.6 | 0.48 |
| Cell size min. (mm) | 0.05 | 0.07 |
| Cell size max. (mm) | 0.6 | 1.29 |

EXAMPLE 2

The silane-grafted single-site initiated polyolefin resin described in Example 1 was compounded on a 1 pound batch scale with other ingredients to give a material having the following formulation:

| Formulation Component | Example 2 PHR |
|---|---|
| LDPE | 44 |
| Engage 8200 1% VTEOS | 56 |
| Zinc stearate | 0.3 |
| Zinc oxide | 0.3 |
| Dicumyl peroxide | 0.6 |
| Azodicarbonamide | 14 |
| Calcium carbonate | 15 |
| Mineral oil | 0.25 |

The compounded materials were cross-linked and expanded as described in Example 1. The mold containing the hot compound was put between heated high pressure hydraulic press platens under pressure for 25 minutes at 260° F. at 500 psi. The material was allowed to complete cross-linking and expansion in the lower pressure mold cavity for about 90 minutes at 320° F. The expanded material was removed from the mold and crushed as described in Example 1. The resulting medium fine open cell foam had the physical properties summarized in Table II.

TABLE II

| Property | Example 2 |
|---|---|
| Density (pcf) | 1.99 |
| Tensile (psi) | 9.45 |
| Deflection (psi) | 375 |
| 25% Compression Deflection (psi) | 0.60 |
| 50% Compression Set (%) (ASTM-3575) | 2.23 |
| 50% Compression Set (%) (ASTM-1056) | 4.55 |
| Tear Die C (pli) | 4.61 |
| Cell size average (mm) | 0.40 |
| Cell size min. (mm) | 0.05 |
| Cell size max. (mm) | 0.90 |

Figure 2:
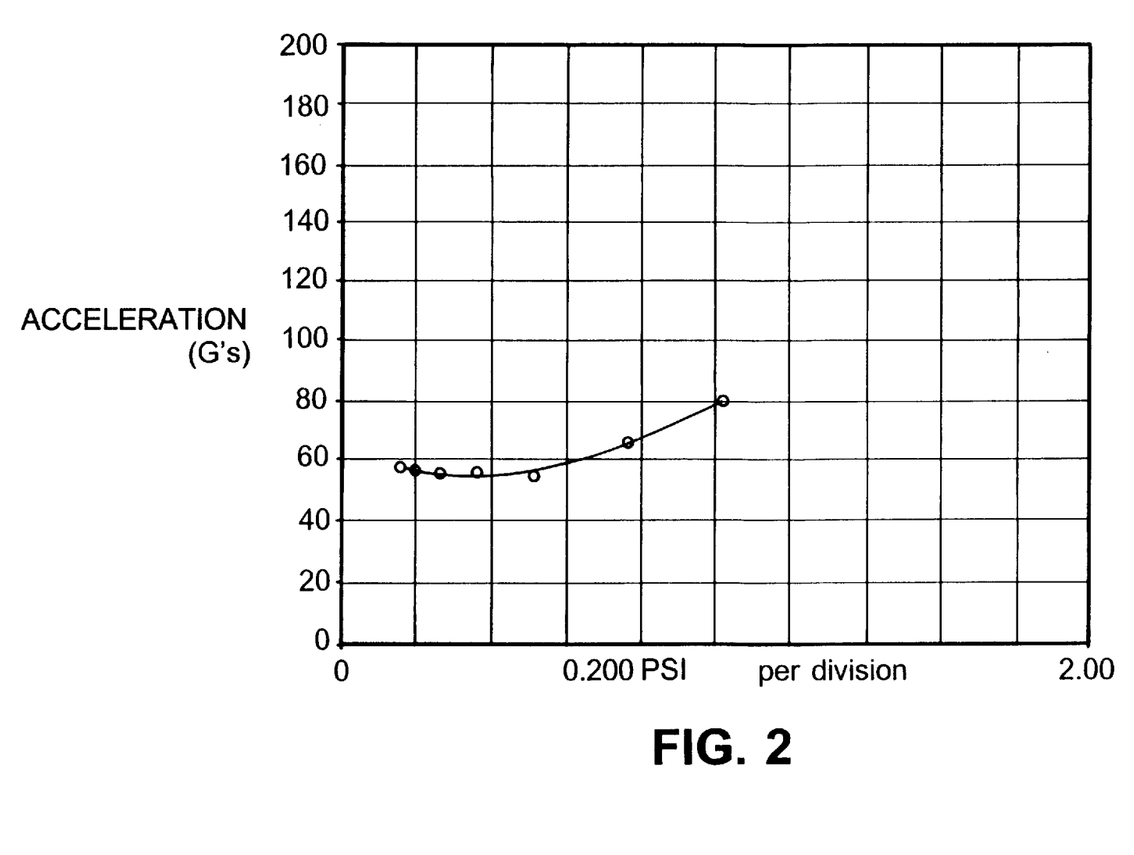
FIG. 2 is a graph depicting a cushioning curve for an open cell foam article.
Figure 3:
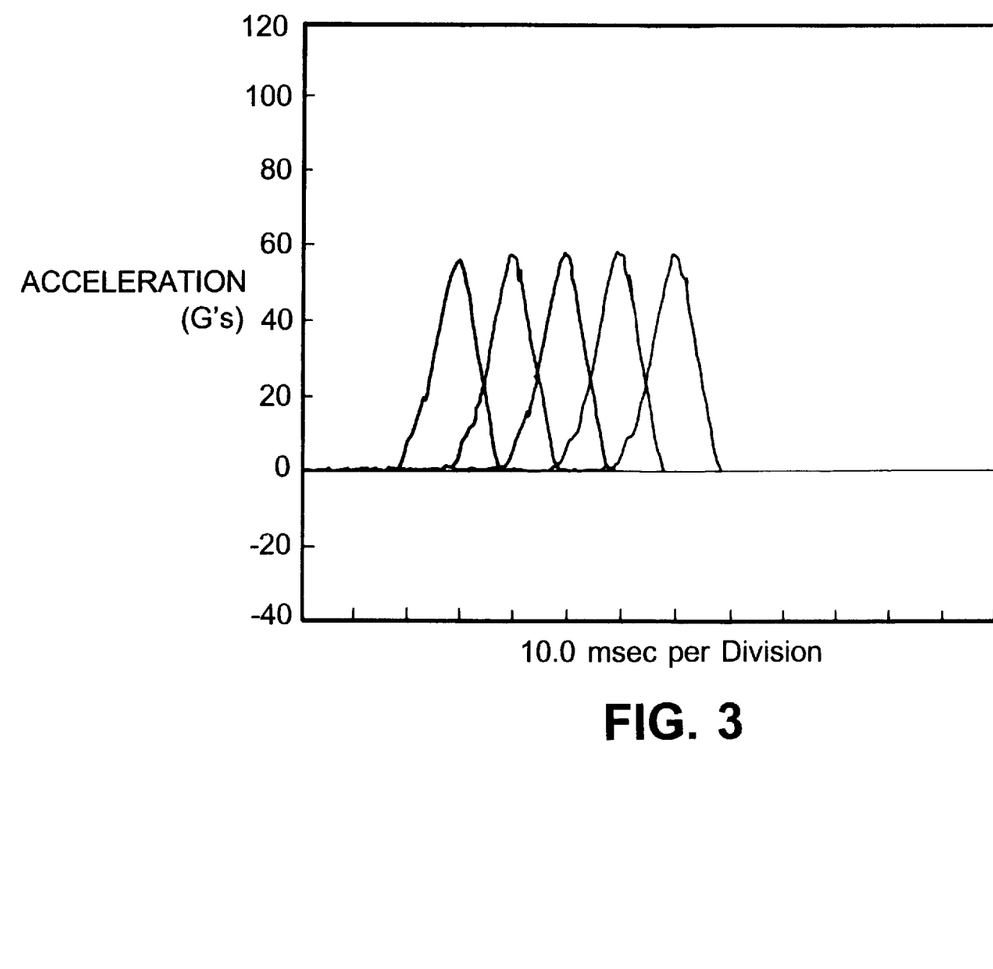
FIG. 3 is a graph depicting a cushioning response curve for an open cell foam article.

The cushioning properties of the foam were tested according to ASTM D-3573 (Condition CC) and ASTM D-1596. The resulting cushioning curves are shown in FIGS. 2 and 3. In the tests depicted in FIGS. 2 and 3, the foam sample was 2 inches thick, 9 inches long, 9 inches wide, and a weight (12.798 pounds) was dropped from a height of 24 inches onto the foam. FIG. 3 shows the recovery response of the foam to the dropped weight. The open cell foamed article had good cushioning properties.

EXAMPLE 3

The composition of Example 2 was compounded and expanded as described in Example 2 on a 150 pound batch scale. The resulting medium fine open cell foam had the physical properties summarized in Table III.

TABLE III

| Property | Example 3 |
|---|---|
| Density (pcf) | 2.00 |
| Tensile (psi) | 17.76 |
| Elongation (%) | 247.92 |
| 25% Compression Deflection (psi) | 0.40 |
| 50% Compression Deflection (psi) | 0.67 |
| 50% Compression Set (%) (ASTM-3575) | 3.52 |
| 50% Compression Set (%) (ASTM-1056) | 6.80 |
| Tear Die C (pli) | 6.78 |
| Cell size average (mm) | 1.00 |
| Cell size min. (mm) | 0.05 |
| Cell size max. (mm) | 1.80 |

EXAMPLE 4

An example of an open cell foamed article including an EVA resin and a silane-grafted single-site initiated polyolefin resin. The components were compounded as described in Example 1 with other ingredients to give a material having the following formulation:

| Formulation Component | Example 4 PHR |
|---|---|
| EVA (AT 1070; AT Polymers) | 60.0 |
| Engage 8180 1% VTEOS | 40.0 |
| Dicumyl peroxide | 0.5 |
| Zinc oxide | 1.0 |
| Azodicarbonamide | 19.0 |
| Calcium carbonate | 15.0 |
| Mineral oil | 1.0 |
| Titanium dioxide | 7.0 |

The compounded materials were cross-linked and expanded as described in Example 1 to afford an open cell foam.

EXAMPLE 5

An example of an open cell foamed article including an LDPE resin and a silane-grafted single-site initiated polyolefin resin. The components were compounded as described in Example 1 with other ingredients to give a material having the following formulation:

| Formulation Component | Example 5 PHR |
|---|---|
| LDPE Dow 510 | 60.0 |
| Engage 8180 1% VTEOS | 40.0 |
| Dicumyl peroxide | 0.6 |
| Zinc oxide | 1.0 |
| Azodicarbonamide | 19.0 |
| Calcium carbonate | 15.0 |
| Mineral oil | 4.0 |

The compounded materials were cross-linked and expanded as described in Example 1 to afford an open cell foam.

EXAMPLE 6

An example of an open cell foamed article including an LDPE resin and a silane-grafted single-site initiated polyolefin resin. The components were compounded as described in Example 1 with other ingredients to give a material having the following formulation:

| Formulation<br>Component | Example 6<br>PHR |
|---|---|
| LDPE Dow 510 | 60.0 |
| Engage 8200 1% VTEOS | 40.0 |
| Dicumyl peroxide | 0.2 |
| Zinc oxide | 1.0 |
| Azodicarbonamide | 19.0 |
| Calcium carbonate | 15.0 |

The compounded materials were cross-linked and expanded as described in Example 1 to afford an open cell foam.

Other embodiments are within the claims.

What is claimed is:

1. An open cell foamed article comprising a silane-grafted single-site initiated polyolefin resin, wherein the foamed article has greater than 10 percent open cells and the single-site initiated polyolefin resin is a polyethylene, a copolymer of ethylene and a C3–C20 alpha-olefin, or a copolymer of ethylene, a C3–C20 alpha-olefin and a C4–C20 diene.

2. The open cell foamed article of claim 1, wherein the single-site initiated polyolefin resin has a density between about 0.83 and about 0.96 g cm$^{-3}$, a molecular weight distribution between about 1.5 and about 3.5, a melt index in the range of about 0.5 dg/min to about 100 dg/min, and a composition distribution breadth index greater than about 45 percent.

3. The open cell foamed article of claim 2, wherein the article includes greater than 5 weight percent of the single-site initiated polyolefin resin.

4. The open cell foamed article of claim 3, wherein the article includes greater than 40 weight percent of the single-site initiated polyolefin resin.

5. The open cell foamed article of claim 4, wherein the article includes greater than 75 weight percent of the single-site initiated polyolefin resin.

6. The open cell foamed article of claim 5, wherein the article includes greater than 90 weight percent of the single-site initiated polyolefin resin.

7. The open cell foamed article of claim 3, wherein the silane-grafted single-site initiated polyolefin resin has a silane-graft content of between about 0.001 and 4 percent.

8. The open cell foamed article of claim 7, wherein the silane-grafted single-site initiated polyolefin resin has a silane-graft content of between about 0.1 and 2 percent.

9. The open cell foamed article of claim 3, wherein the silane includes a vinyl silane having 2 or 3 hydrolyzable groups.

10. The open cell foamed article of claim 9, wherein the silane includes vinyl triethoxysilane.

11. The open cell foamed article of claim 3, comprising a partially cross-linked polyolefin blend including the single-site initiated polyolefin resin and a copolymer including ethylene and propylene, an ethylene-propylene-diene monomer terpolymer, an ethylene-vinyl acetate copolymer, an ethylene-maleic anhydride copolymer, an ethylene-ethyl acrylate copolymer, a polystyrene, a low density polyethylene, a linear low density polyethylene, a medium density polyethylene, a high density polyethylene, or a polypropylene.

12. The open cell foamed article of claim 11, wherein the polyolefin blend is partially silane-grafted.

13. The open cell foamed article of claim 1, wherein the foamed article has greater than 40 percent open cells.

14. The open cell foamed article of claim 13, wherein the foamed article has greater than 80 percent open cells.

15. The open cell foamed article of claim 3, wherein the silane further comprises an alkyl trialkoxy silane, where the alkyl is a C1 to C20 group and the alkoxy is a C1 to C10 group.

16. A method of making an open cell foamed article comprising the steps of:

providing a mixture including silane-grafted single-site initiated polyolefin resin and a foaming agent, wherein the single-site initiated polyolefin resin is a polyethylene, a copolymer of ethylene and a C3–C20 alpha-olefin, or a copolymer of ethylene, a C3–C20 alpha-olefin and a C4–C20 diene;

partially cross-linking the mixture; and expanding the mixture to form an open cell foamed article having greater than 10 percent open cells.

17. The method of claim 16, wherein the step of expanding the mixture comprises continuous extrusion of the mixture.

18. The method of claim 16, wherein the step of expanding the mixture comprises free expansion of the mixture.

19. The method of claim 16, wherein the step of expanding the mixture comprises compression molding the mixture at increased temperature and pressure.

20. The method of claim 19, wherein compression molding comprises the steps of pressing the polymer mixture using a high tonnage press at a temperature of between 240° and 480° F. and a pressure of between 50 and 5000 psi for between 20 and 90 minutes followed by heating the polymer mixture at a temperature between 300° and 380° F.

21. The method of claim 20, wherein compression molding comprises the steps of pressing the polymer mixture using a high tonnage press at a temperature of between 275° and 320° F. and a pressure of between 250 and 2500 psi for between 20 and 90 minutes followed by heating the polymer mixture at a temperature between 300° and 380° F.

22. The method of claim 16, wherein the step of cross-linking the polymer blend includes hydrolyzing the silane.

23. The method of claim 16, further comprising the step of crushing the foamed article after the expanding step.

24. The method of claim 23, wherein the foamed article has greater than 50 percent open cells after the crushing step.

25. The method of claim 24, wherein the foamed article has greater than 80 percent open cells after the crushing step.

26. The method of claim 23, further comprising the step of pinning the foamed article.

27. The method of claim 16, wherein the step of cross-linking the polymer blend further includes cross-linking with a peroxide.

28. The method of claim 16, wherein the mixture includes a partially cross-linked polyolefin blend including the single-site initiated polyolefin resin and a copolymer including ethylene and propylene, an ethylene-propylene-diene monomer terpolymer, an ethylene-vinyl acetate copolymer, an ethylene-maleic anhydride copolymer, an ethylene-ethyl acrylate copolymer, a low density polyethylene, a linear low density polyethylene, a medium density polyethylene, a high density polyethylene, or a polypropylene.

29. The method of claim 28, further comprising the step of grafting the polyolefin blend with a silane.

30. The method of claim 16, wherein the mixture includes an alkyl trialkoxy silane, where the alkyl is a C1 to C20 group and the alkoxy is a C1 to C10 group.

* * * * *